United States Patent [19]
Calame

[11] 3,990,153
[45] Nov. 9, 1976

[54] AUTOMATIC MEASUREMENT OF WORKPIECES

[76] Inventor: Michel Calame, Avenue Cure-Baud 81, 1212 Grand-Lancy, Geneva, Switzerland

[22] Filed: Feb. 5, 1975

[21] Appl. No.: 547,250

Related U.S. Application Data

[63] Continuation-in-part of Ser. No. 319,644, Dec. 29, 1972, abandoned.

[30] Foreign Application Priority Data
Jan. 25, 1972 Switzerland............................ 1048/72

[52] U.S. Cl................................ 33/1 M; 33/172 E; 33/174 L
[51] Int. Cl.²........................................... G01B 7/14
[58] Field of Search............... 33/1 M, 174 L, 172 E

[56] References Cited
UNITED STATES PATENTS

| | | | |
|---|---|---|---|
| 2,911,727 | 11/1959 | Steinhart | 33/174 L |
| 2,930,976 | 3/1960 | Hirdler | 33/174 L X |
| 3,046,665 | 7/1962 | Nilsson | 33/174 L X |
| 3,434,218 | 3/1969 | Potter | 33/1 M |
| 3,750,295 | 8/1973 | Nordmann et al. | 33/174 L |

*Primary Examiner*—William D. Martin, Jr.
*Attorney, Agent, or Firm*—Young & Thompson

[57] ABSTRACT

A measuring machine pick-up, for measuring e.g. watch movements, has measuring means mounted on a measuring head for movement in two or three orthogonal directions. The measuring means are plural, so that plural measurements may be effected without changing the parts.

3 Claims, 3 Drawing Figures

FIG.1
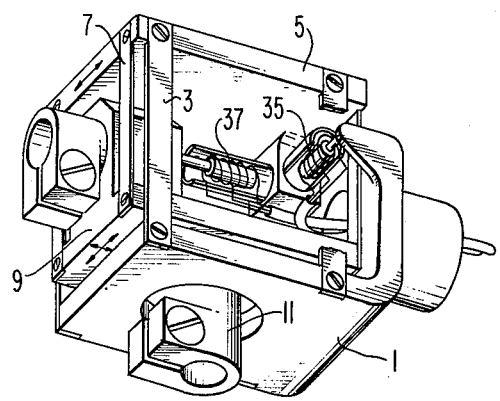
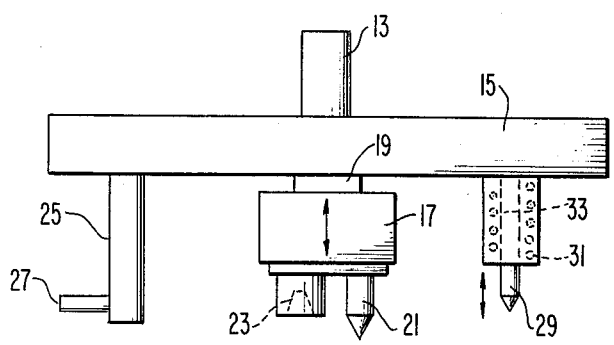
FIG.2
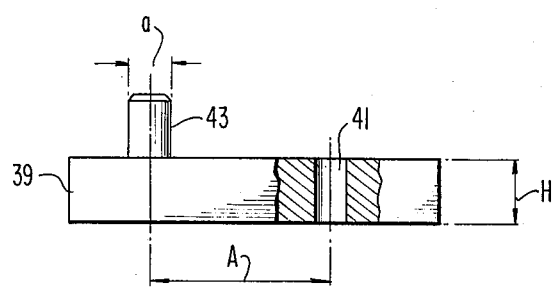
FIG.3

AUTOMATIC MEASUREMENT OF WORKPIECES

The present application is a continuation-in-part of my copending application Ser. No. 319,664, filed Dec. 29, 1972 now abandoned.

The present invention relates to the automatic measurement of workpieces, more particularly to the performance of a number of different measurements on each of a plurality of indentical workpieces. The invention is useful in connection with any of a variety of workpieces, but will be described and illustrated, by way of example only, in connection with the measurement of a number of different physical features of watch movements.

In the measurement of watch movements, the following parameters are the most important:

the coordinates of the holes of the plates without the jewels and without the bridges, the coordinates of certain holes after mounting the jewels, the coordinates of the screw holes, the coordinates of the bridge holes on th plate without the jewels and then with the jewels, the interaxial distance of certain holes, the misalignment of corresponding holes of the plates and of the bridges, the distance between and the relative orientation of various other parts.

Given the large number of workpieces and the number of measurements to be made thereon, it is obvious that 100 percent control is unfeasible. Therefore, control must be effected by sampling. It is nevertheless evident that the more of the above parameters that can be measure rapidly, the larger the number of workpieces it is possible to check in a given time and so the wider the choice of a sampling base.

The system according to the present invention provides for the measurement of two or three axial coordinates for comparison of the obtained data with predetermined data corresponding to the desired position of the points to be measured, which may be computer controlled and which may feed the obtained data to a computer. Such systems are broadly old, as in my earlier U.S. Pat. No. 3,742,610, the disclosure of which is incorporated by reference into the present application.

Such apparatus operates as follows:

The reference data on the proper location of the points to be measured is fed to the computer memory. The machine is then moved so that these points are presented beneath the measuring means. The difference between the nominal locations and the actual locations is then measured by the device. The obtained data is then processed and printed out.

The automatic process concludes with the analysis of the results and according to the resultant decision, human intervention in the manufacturing process may or may not be necessary.

The rectangular coordinates are followed by movement of the table carrying the workpieces on the structure in the direction X, the displacement of a measuring head in the directions X and Y, and the displacement of measuring means on the head in the direction Z. Three slideways to guide these displacements may be known type, constituted by tongue and groove connections in a well known manner.

Direct current servomotors may assure the displacements and the precise positionings.

The measuring systems may be steel rules divided in millimeters, with the intervals between marks subdivided by a photoelectric microscope to one in 10,000 parts, to 0.1 $\mu m$.

The measuring device comprises two deformable parallel-epipedal constructions one within the other. The measurement itself is made by inductive transducers whose displacements are measured by numerical voltmeters sensitive to a movement of 0.1 $\mu m$.

The feeler for holes is a cone that bears against the edge of the holes and is pressed downwardly by the double parallelepipedal structure which ensures, thanks to a certain vertical elasticity, the application of the necessary measuring force.

Before adopting the conical feeler, there was measured the form of the holes at different levels and having errors of circularity of the order of 1 $\mu m$. To localize the center of the holes having such errors, with the same order of error or less, is not possible but for the fact that the pivot or the jewel which will rest therein occupies a position very close to the center of the inscribed circle. The conical feeler also gives this position.

For holes with jewels in place, it is not longer a matter of error of shape but rather, in view of their small size, the conical feeler is now the best means for locating them.

The feeler used for the ends of the screws is also a cone, but a hollow one, which surrounds the screw end.

The feeler for measuring the distance between pins or abutments is a horizontal cylindrical pin parallel to the Y axis. It comes into contact with the abutment almost as does the fork of the watch, the difference being that the movement of the pin is rectilinear along the X axis while the movement of the fork is rotative.

This manner of measurement makes it desirable to orient the watch movements on the work support in such a way that a straight line joining the abutments will be parallel to the X axis. Contrary to the conical feeler, the pin is not subjected to a vertical measuring force and should be rigid in the vertical direction. It can exercise a horizontal measuring force to the left on one of the abutments and to the right on the other. This force is obtained by the elastic deformation of the parallelepipedal structure corresponding to the X axis movement of the head.

The head carries plural feelers simultaneously. Their distance is selected in such a way that the one will be disengaged and spaced from the workpiece while the other is in contact with the workpiece. This distance of course can be standardized before the measurements by means of an extremely simple reference constituted by a small vertical cylinder of a known diameter provided with a central hole which is exactly concentric.

The first step is to load the watch movements on to plates of which each carries a plurality, each movement being fixed in a predetermined position by pins entering holes of the workpieces. In addition to these pins, the workpiece holder plate is provided with two holes which are very accurately formed, one of which constitutes the locator and the second of which defines the orientation of the plate with respect to the coordinates of the machine.

The workpiece holding plate of course will not be perfectly accurate, and so the next step is to measure its position. That is done by means of a steel gauge which registers with the plate and is positioned successively at various positions.

These data permit the measurement and elimination of errors of position and the orientation of each workpiece on the holder plate and of the latter on the machine.

The capacity of the computer may for example permit the retention of data from two plates.

Finally the desired dimensions of the workpieces are programmed, namely:

the nominal coordinates of the points to be measured with the diameters of the holes and their level, including tolerances, the data of the interaxial distances for the plate and then for the bridges, with tolerances, the data on misalignments with their tolerances.

All these data are introduced in turn, following scrupulously the indicated instructions in such a manner that they are properly stored.

The measurement itself may be effected first by given several orders to the operator who operates the computer by:

pressing certain buttons, giving the date, the caliber designation, and the lot number.

bringing, by manually manipulating the machine, the feeler into contact with the reference tool and then with the locator hole of the plate, finally pressing the start button, which initiates automatic operation.

From this time on all the pieces of the lot are measured without intervention by the operator. This proceeds according to a predetermined order according to the data that have been fed. If in the initial phase of the computer operation the operator has so programmed it, the machine will automatically return to the initial position in such a way as to avoid inaccuracies due to temperature change.

At the same time that the machine is measuring, the data print out proceeds for each workpiece. The computer calculates almost instantaneously the conversions of the coordinates according to the fact that, the data having been introduced in a predetermined fashion, the watch movements are nominally oriented with the escapement abutments along the X axis and substantially oriented according to the measuring positions of the plate.

When the measurements have been made, the machine table may receive the next batch of workpieces, in position on the second plate.

The calculator computes and prints the end of the report in which are found the distances arranged according to holes, the averages and the types of error.

The presence of the operator is not necessary except during the first two or three minutes, the rest of the operation being 100 per cent automatic. The prodigous amount of information collected and the rapidity with which it is done make the classic microscopic measurements seem quite primitive in comparison.

For example, according to the classic measurement methods, one workpiece might be measured in one day with a margin of error of the order of magnitude of $\pm 1$ $\mu m$; while by contrast, using the present invention, 30 workpieces could be measured in 2 hours with a margin of error of the order of $\pm 3$ $\mu m$. In other words, using th present invention, it is possible to achieve thirty times the production in four times less time, with three times as much precision, compared to the known methods.

The position of the machine and the statistical values obtained show with certainty the quality of the workpieces. Any tendency toward deviations during manufacturing will be rapidly detected and in ample time for manual intervention to determine and correct the cause of the deviation.

The close quality control which is made possible by the present invention thus is a far cry from the old systems, in which it was possible only to accept or reject the product. By contrast, the new sytem makes it possible to exercise preventive control thanks to which the onset of defects is detected and can be corrected before it becomes so serious as to require rejection of the workpieces.

These and other objects, features and advantages of the present invention will become apparent from a consideration of the following description, taken in connection with the accompanying drawing, in which:

FIG. 1 is a perspective view from below, of a mounting means for a measuring head according to the present invention;

FIG. 2 is a side elevational view of th measuring head detached from the mounting of FIG. 1; and FIG. 3 is a side elevational view with parts broken away of a gauge for the various measuring means on the measuring head.

Referring now to the drawing in greater detail, and first to FIG. 1, there is shown apparatus according to the present invention, comprising a frame 1 which is mounted on conventional means (not shown) for selectively positioning it in any of a plurality of predetermined positions above a series of workpieces (not shown), which in turn are precisely mounted in predetermined positions on a workpiece holder plate (not shown) which itself may be precisely mounted along all three orthogonal axes in the manner described above.

The mounting of frame 1 to precisely predetermined positions in all three axial directions, and the precise mounting of the workpieces and their support for selective positioning in all three axial directions, is conventional and does not form a part of this invention and so need not be described in greater detail. These and other known details of construction are as in my above-identified patent.

Fixedly secured at one end to opposite sides of a lower portion of frame 1 are four resilient steel leaf springs 3 which at their upper ends are fixedly secured to a plate 5. Plate 5 is thus mounted by springs 3 for movement in one axial direction relative to frame 1.

Fixedly secured at their upper ends to plate 5 are four resilient steel leaf springs 7 which at their lower ends are fixedly secured to plate 9, whereby plate 9 is mounted by springs 7 for movement relative to plate 5 in another axial direction and by springs 3 for movement relative to frame 1 in the first-mentioned axial direction.

A clamping collar 11 is fixedly secured to the underside of plate 9 and depends therefrom through frame 1 and releasably but rigidly retains therein an upright cylindrical stud 13 by which the horizontal plate 15 of the measuring head shown in FIG. 2 is secured in precisely predetermined position relative to the frame 1.

Depending from plate 15 are a plurality of sensing means whose number, shapes and dimensions and rest positions relative to each other are precisely predetermined according to the exact nature, shape and dimensions of the features to be measured on the workpieces, for example, the watch movements described above.

It is the provision of a plurality of different sensing means on the same measuring head, that is at the very heart of the present invention.

Thus, there depends from plate 15 a carrier 17 that is vertically movable on and relative to plate 15 by means of a resilient mounting 19. Depending from carrier 17 are two sensing means 21 and 23. Sensing means 21 is a conical male member while sensing means 23 is a conical female member. Means 21 locates holes while means 23 locates pins or the ends of screws. The movement of carrier 17 relative to plate 15 which is permitted by resilient mounting 19, although in the third orthogonal direction, is not measured but rather is for the purpose of ensuring that the sensing means 21 and 23 will meet the workpieces with only limited force, thereby to avoid damage to the workpieces and/or the sensing means 21, 23.

Depending from plate 15 and fixedly secured thereto is a vertical cylindrical rod 25 for measuirng the diameters of recesses, that is, for comparing the internal diameter of a recess with the external diameter of rod 25. A horizontal cylindrical rod 27 is also fixedly secured to plate 15, either by rod 25 or by a separate mounting. The diameter of rod 27, like that of rod 25, is precisely predetermined and rod 27 thus can measure horizontal distances such as the distance between two pins or two abutments. To this end, rod 27 is precisely parallel to one of the two directions of orthogonal movement permitted by springs 3 and 7.

Also depending from plate 15 is a vertical rod 29 that has a spherical lower tip. Rod 29 is vertically movable in a direction precisely parallel to the third orthogonal axis of the apparatus, that is, precisely vertical, this vertical movement being resisted by spring means 31 which urge rod 29 downwardly to a precisely predetermined stop position. Spring means 31 also includes a transducer 33 for measuring the amount by which rod 29 rises from its stop position, thereby to measure the elevation of a surface on a workpiece, e.g. the depth of a recess.

Transducers 35 and 37 are also provided (see FIG. 1) for measuring respectively the movement of plate 9 relative to frame 1 in one orthogonaL direction as permitted by springs 3, and the movement of plate 9 relative to frame 1 in another orthogonal direction as permitted by springs 7.

The transducers 33, 35 and 37, and their operation and their relationship to their immediately adjacent parts, and the means by which the signals transmitted by the transducers is evaluated, can be as in may above-identified patent.

Thus, the movement of rod 29 relative to a predetermined reference position can be measured in all three orthogonal directions; while that of members 21, 23, 25 and 27 can be measured in two orthogonal directions.

As indicated above, the positions of the members 21–29 are precisely predetermined relative to a predetermined reference position and relative to each other. To check the accuracy of the distances between the sensing members, a guage as in FIG. 3 may be used, comprising a plate 39 which may be accurately located by any conventional means (not shown), and having an opening 41 for checking the correct location of the sensing means 21 and the correct location of the rod 29. A peg 43 ustands from plate 39 for checking the correct location of the sensing means 23 and the rods 25 and 27. The dimensions a, A and H of the gauge are precisely predetermined and so permit precise determination of the accuracy of the position of the members 21–29.

The operation of the device is accordingly as described in greater detail above: any reading of the signals from transducers 33–37 that departs from the predetermined standard is accordingly an error signal and may give early warning of the need for human intervention in what can otherwise be highly automated production operations.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A measuring machine pick-up comprising a frame, a movable member, means mounting said member on said frame for movement relative to said frame in at least two orthogonal directions, at least two transducers one to sense the degree of movement of said member relative to said frame in each of said at least two directions, and at least two sensing means of different shapes carried by said member in predetermined spaced relation to each other, said mounting means comprising a plurality of parallel resilient first leaf springs which at one end are fixedly secured to said frame and at their other ends are fixedly secured to a plate whereby said plate is mounted by said first leaf springs for movement in a first orthogonal direction relative to said plate, and a plurality of resilient second leaf springs parallel to each other and disposed in planes perpendicular to said first leaf springs and secured at one end to said plate and being at their other ends fast with said member whereby said member is mounted for movement relative to said plate in a second orthogonal direction and relative to said frame in said first and second orthogonal directions.

2. A pick-up as claimed in claim 1, there being two said transducers carried by said frame for measuring said movement of said member relative to said frame in each of said first and second orthogonal directions.

3. A measuring machine pick-up cmprising a frame, a movable member, means mounting said member on said frame for movement relative to said frame in at least two orthogonal directions, at least two transducers one to sense the degree of movement of said member relative to said frame in each of said at least two directions, and at least two sensing means of different shapes carried by said member in predetermined spaced relation to each other, the number of said sensing means on said member being greater than the number of said transducers.

* * * * *